E. HUTCHINSON.
Perches for Bird-Cages.
No. 149,657. Patented April 14, 1874.
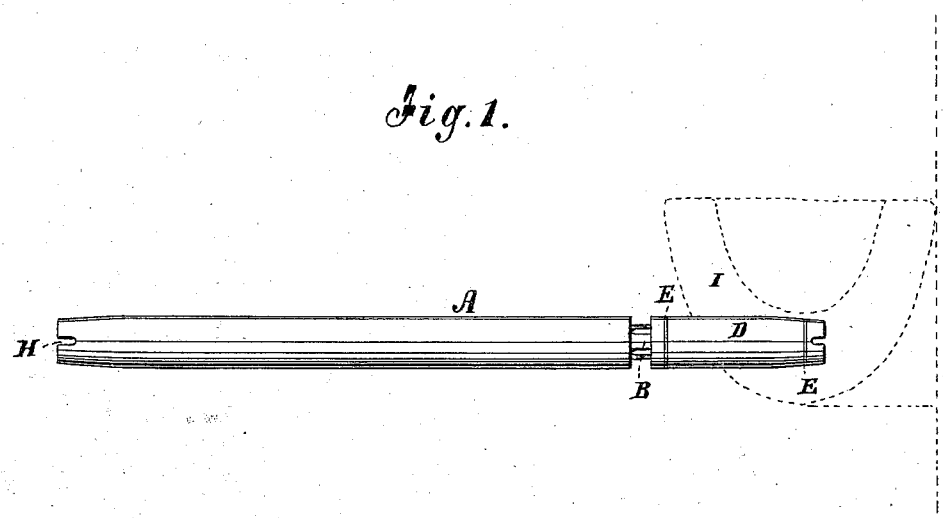
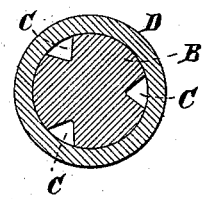
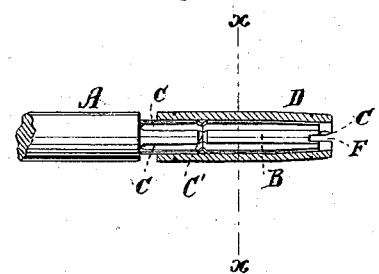
WITNESSES:
INVENTOR:
E. Hutchinson
BY
ATTORNEYS.

UNITED STATES PATENT OFFICE.

EDWARD HUTCHINSON, OF NEW YORK, N. Y.

IMPROVEMENT IN PERCHES FOR BIRD-CAGES.

Specification forming part of Letters Patent No. 149,657, dated April 14, 1874; application filed December 29, 1873.

*To all whom it may concern:*

Be it known that I, EDWARD HUTCHINSON, of the city, county, and State of New York, have invented a new and Improved Perch for Bird-Cages, of which the following is a specification:

My improved perch is composed of a tubular piece of wood or other suitable substance, and a cylindrical piece, the latter being for the most part of its length of the same size as the former, but considerably longer, and having a portion of about equal length of the tube reduced sufficiently to enter the tube and fit snugly, and so that the end of the tube and the shoulder of the cylinder will not quite meet together, said reduced portion of the cylindrical piece being provided with small grooves, both longitudinal and circumferential, to afford hiding and nesting places for the small insects which infest birds, whereby the insects may be readily destroyed and cleaned off from the perch by taking it out of the cage from time to time, plunging it in boiling water, and then separating the parts and removing the insects. By preference, the length of the tubular portion of the perch will be such that, the perch being fixed in the bottom of the nest at one side of the cage, the little annular groove between the shoulder of the cylinder and the end of the tube, which affords the entrance to the grooves within the tube, will, when the perch is properly adjusted, come to the middle of the nest, or thereabout, where the insects which mostly infest the nests will most readily find the hiding-places provided for them.

Figure 1 is a side elevation of a perch constructed according to my invention; it also shows a section of a nest in dotted lines. Fig. 2 is a side elevation of a portion of the cylindrical part of the perch and a longitudinal sectional elevation of the tube, and Fig. 3 is a cross-section of the perch on the line $x\,x$ of Fig. 2.

Similar letters of reference indicate corresponding parts.

A represents the principal part of the perch, which I have called the cylindrical part; but is not necessarily cylindrical, except in the reduced part B, which enters the other tubular part D, and has the grooves C C' formed in it to make desirable hiding-places for the insects. Tube D is bound at the ends with wires E to protect it from splitting, and it has a notch, F, at the end for fastening it to the wires of the cage. Part A has a point, G, to enter the back of the cage, and a notch, H, at its other end; but these contrivances for fastening the perch in the cage may be of any kind. I represents a portion of a nest in dotted lines; it is introduced to show the relation of the entrances to the grooves C to it when the perch is in position.

Having thus described my invention, I claim as new and desire to secure by Letters Patent—

1. A perch for birds, composed of a tubular part, D, and a round or other suitably-shaped part, A, the latter having a grooved part, B, fitted in part D detachably, to afford hiding-places for insects, substantially as specified.

2. In a bird-cage, the arrangement of the nest with the perch, having recesses for insects, as described.

EDWARD HUTCHINSON.

Witnesses:
 A. P. THAYER,
 T. B. MOSHER.